Figure 1:
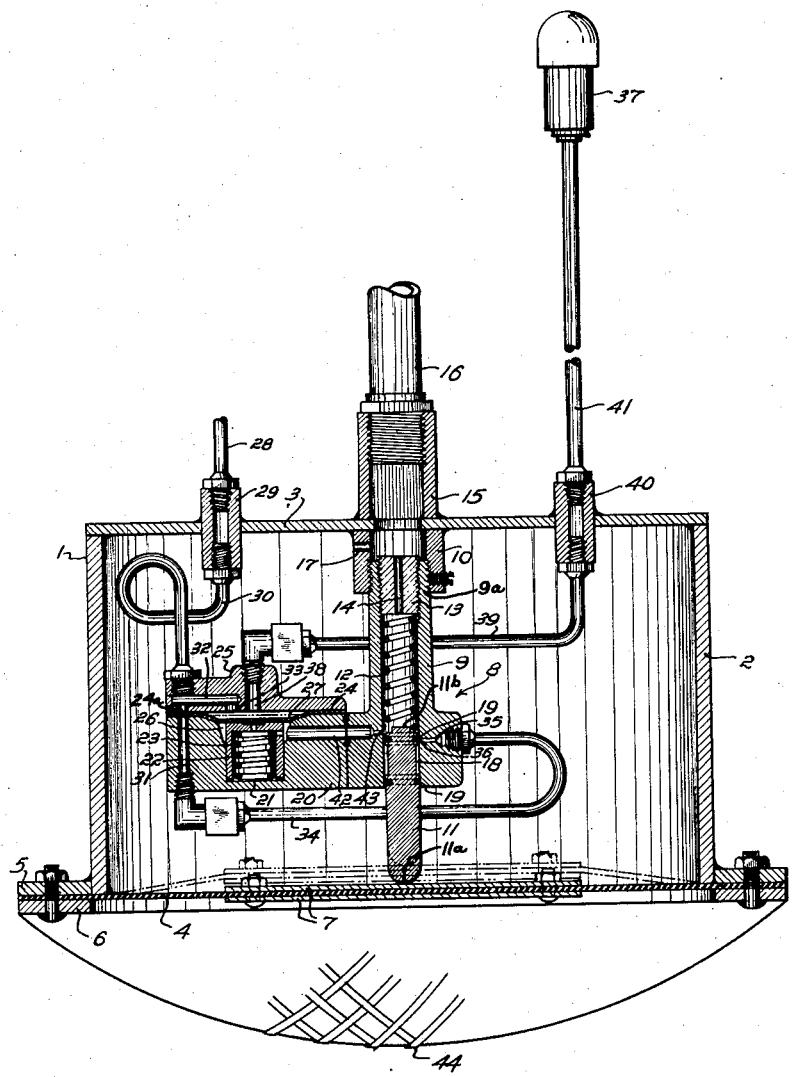

Sept. 23, 1958

W. E. OAKES 2,853,041

LIQUID LEVEL ALARM DEVICE

Filed Sept. 28, 1956

INVENTOR

By: William E. Oakes

ATTORNEY

2,853,041

LIQUID LEVEL ALARM DEVICE

William E. Oakes, Edmonton, Alberta, Canada

Application September 28, 1956, Serial No. 612,839

2 Claims. (Cl. 116—109)

This invention relates to low liquid level alarm devices.

There are many instances where it is desirable to indicate the dropping of the liquid level in a liquid body below a predetermined minimum. For instance, in oil well drilling, the mud or drilling liquid acts as a seal to keep gas from rising out of the drill hole. Should the drilling mud become dissipated in a porous formation, disastrous results could ensue as a consequence of loss of the gas seal. Thus, it is highly important that some indication of the loss of such gas seal be given immediately it occurs.

It is an object of this invention to provide a device of simple manufacture and positive operation which will produce an alarm at a predetermined low liquid level in a body of liquid.

Another object is to provide an alarm device which possesses a minimum of moving parts for easy adjustment and servicing with standard tools, and which lends itself to rugged construction capable of withstanding rough handling in the field.

Another object is to provide an alarm device which employs an inert fluid such as air as an operating medium for safe operation under various conditions.

The invention resides in an alarm device comprising a casing, one wall of which is constituted by a diaphragm having pressure responsive movement, a valve body in the casing having a spring-balanced piston therein moveable in response to movement of the diaphragm, a fluid-operable alarm, and a fluid line connected to the alarm, the valve-piston controlling flow of fluid through the fluid line to interrupt such flow when the diaphragm moves the valve piston to one position.

The invention will be described with reference to the accompanying drawing, in which:

The single figure is a sectional elevation of a device in accordance with the invention.

In the drawing, 1 is a generally cylindrical casing having a side wall 2, and top wall 3, and the bottom wall of which is constituted by a flexible diaphragm 4, the peripheral portion of which is clamped between an outwardly projecting flange 5 fixed to the casing side wall 2 and a ring 6. The central portion of the diaphragm is clamped between a pair of circular plates or discs 7.

Mounted in the casing is a valve body 8 having a cylinder 9, the body 8 being conveniently suspended from the casing top wall 3 by threaded engagement of the upper end 9a of the cylinder with a tubular member 10 depending axially from the top wall 3.

A piston 11 is reciprocally mounted in cylinder 9 with its lower end 11a projecting downwardly from the valve body and in axial engagement with a plate 7 of the diaphragm 4. The upper end of the piston is under a predetermined pressure by means of a coil spring 12 which is positioned in the cylinder between the upper end 11b of the piston and cap 13 in the upper end of the cylinder. Cap 13 has an axial passage 14 communicating through tubular member 10 and nipple 15 with atmosphere through a conduit 16. The interior of casing 1 is likewise vented to atmosphere through an opening 17 in the tubular member.

The portion of the piston 11 within the cylinder is provided with an annular recess 18 and a sealing ring 19 above and below such recess.

A diaphragm valve is provided and comprises a laterally disposed portion 20 of the valve body having a cylindrical recess 21 in which a plunger 22 is reciprocally mounted. Plunger 22 is urged in an upward direction by a spring 23. A flexible diaphragm 24 engages the upper end of plunger 22 and is clamped in place by means of a separable head 25 of portion 20. An annular recess 26 in portion 20 surrounds the upper end part of plunger 22. It will be observed that, when plunger 22 and diaphragm 24 are in lowermost position, a space 27 is provided between the upper surface of diaphragm 24 and head 25.

Operating fluid, such as air under pressure, is supplied through a line 28, nipple 29 in the top casing wall 3, and flexible hose 30 to a passage 31 extending through head 25, an opening 24a in diaphragm 24, and portion 20. While the ensuing description will refer to air as the operating fluid, it will be understood that any other suitable medium may be employed.

Passage 31 has a branch 32 in head 25 with port 33 opening into space 27. The lower end of the passage communicates through a hose 34 with a passage 35 in the wall of cylinder 9 having a port 36 opening into the interior of the cylinder and arranged for closure by the piston or communication with recess 18 depending upon the position of piston 11.

The space 27 above diaphragm 24 communicates with an alarm such as a whistle 37 by means of passage 38 in head 25, hose connection 39, nipple 40 in top wall 3 of the casing, and hose 41.

The annular recess 26 below diaphragm 24 communicates with the interior of cylinder 9 through a passage 42 and port 43. Port 43 is in somewhat opposed relation to port 36 but is at a slightly higher level. It is arranged for communication with the space above the piston 11 in cylinder 9 or with the recess 18 in the piston depending upon the position of the latter.

A protective grating or screen 44 is preferably fixed to ring 6 in spaced relation to diaphragm 4.

In operation, the device is partly or wholly immersed in the liquid mass, such as drilling mud, the level of which it is required to maintain. The device is adjusted whereby the static forces of the liquid mass will maintain the diaphragm 4 in upper or dotted line position indicated in the drawing, the plates 7 serving to collect such forces and transmit them to the piston 11. In this position of the piston, both ports 36 and 43 are in communication with each other through annular recess 18. With air under pressure supplied through line 28, the upper surface of diaphragm 24 is subject to air pressure through branch passage 32. However, the lower surface of diaphragm 24 is also subject to such air pressure through passage 31, hose 34, port 36, recess 18, port 43 and passage 42. The added force of spring 23 moves plunger 22 and diaphragm 24 upwardly to close port 33 and passage 38 leading to whistle 37.

Should, however, the level of the liquid mass to be controlled drop to a predetermined minimum, diaphragm 4 will also drop under the pressure of spring 12, which is chosen to maintain the desired balance of piston 11. The device then assumes the full line position of the drawing wherein port 36 is closed and port 43 is vented to atmosphere through cylinder 9, passage 14, and conduit 16. The air under pressure then depresses diaphragm 24, to place port 33 in communication with passage 38 through space 27. The whistle 37 will then be actuated to sound an alarm. Thereafter, when the level of the liquid mass is raised to the desired degree, the piston 11 will again be moved upwardly to cut off the supply of air to the whistle and the alarm ceases.

It will be observed that pressure in the casing is always atmospheric. Thus, air leakage from any component therein will not render the device inoperative, because there can be no pressure build-up in the casing itself. Since, however, the operating parts are housed in a completely sealed casing except for the three operating lines 16, 28 and 41, which for convenience are preferably flexible hoses, trouble-free operation is assured.

It will be apparent that various obvious changes may be made in the mechanical details of the device as described within the scope of the appended claims.

I claim:

1. A liquid level alarm device comprising a casing adapted to be placed in a body of liquid, said casing having a top wall and a diaphragm constituting the bottom wall thereof, said diaphragm being arranged to assume an upper position under the influence of said body of liquid and a lower position in response to a predetermined drop in level of said body of liquid, a valve body in said casing having a cylinder, means venting the interior of said cylinder to atmosphere, a piston reciprocally mounted in said cylinder and having one end projecting from said cylinder and engaging said diaphragm for reciprocal movement in one direction in response to movement of said diaphragm from lower to upper position, a spring in said cylinder urging said piston towards said diaphragm, said valve body having first and second passages each communicating with the interior of said cylinder, said piston having an annular recess therein, said piston in said upper position of said diaphragm placing said first and second passages in communication through said recess and in the lower position of said diaphragm closing said first passage and opening said second passage, means for supplying fluid under pressure to said first passage, a fluid-operable alarm externally of the casing, a branch passage leading from said first passage to said alarm for supplying fluid under pressure to actuate said alarm, a diaphragm valve controlling flow of fluid through said branch passage, said diaphragm valve being responsive to fluid under pressure in said second passage to close said branch passage when said diaphragm is in upper position and to open said branch passage in the absence of fluid under pressure in said second passage when said diaphragm is in lower position to actuate said alarm.

2. A liquid level alarm device as defined in claim 1, said diaphragm valve comprising a diaphragm movable to close and open said branch passage, and a spring-urged plunger engaging one side of said valve diaphragm and urging said valve diaphragm into closed position, said branch passage also communicating with said one side of said valve diaphragm to supply fluid under pressure to said one side of said valve diaphragm.

References Cited in the file of this patent

UNITED STATES PATENTS

| | | |
|---|---|---|
| 2,774,324 | James | Dec. 18, 1956 |
| 2,786,437 | Oakes | Mar. 26, 1957 |